United States Patent [19]

Alexander

[11] Patent Number: 4,525,767
[45] Date of Patent: Jun. 25, 1985

[54] CERAMIC CAPACITOR AND DIELECTRIC COMPOSITIONS

[75] Inventor: John H. Alexander, Bishop's Stortford, England

[73] Assignee: Standard Telephones and Cables plc, London, England

[21] Appl. No.: 619,391

[22] Filed: Jun. 11, 1984

[30] Foreign Application Priority Data

Jul. 13, 1983 [GB] United Kingdom ................ 8318901

[51] Int. Cl.³ .......................... H01G 4/10; H01G 4/12
[52] U.S. Cl. ...................................... 361/321; 264/61; 264/62; 264/272.18; 427/79; 501/139
[58] Field of Search .......................... 427/79; 252/521; 264/61, 62, 272.18; 29/25.42; 501/137, 139

[56] References Cited

U.S. PATENT DOCUMENTS

| | | | |
|---|---|---|---|
| 3,080,239 | 3/1963 | Zlotnick | 501/139 |
| 4,014,707 | 3/1977 | Tanaka et al. | 501/139 |
| 4,377,548 | 3/1983 | Pierpont | 264/272.18 |

FOREIGN PATENT DOCUMENTS 49-34905  3/1974  Japan ................................ 501/139

OTHER PUBLICATIONS

Murakami et al., American Ceramic Society Bulletin, vol. 55, No. 6, pp. 572–575, Jun. 1976.

Primary Examiner—Richard Bueker
Attorney, Agent, or Firm—Kerkam, Stowell, Kondracki & Clarke

[57] ABSTRACT

A dielectric composition, for use in the manufacture of ceramic capacitors, and comprised of barium titanate ($BaTiO_3$) with small additions of niobium pentoxide ($Nb_2O_5$) and gadolinium sesquioxide ($Gd_2O_3$).

9 Claims, No Drawings

CERAMIC CAPACITOR AND DIELECTRIC COMPOSITIONS

BACKGROUND OF THE INVENTION

This invention relates to ceramic capacitors and in particular to dielectric compositions for use in ceramic capacitors, for example ceramic disc capacitors.

SUMMARY OF THE INVENTION

According to one aspect of the present invention there is provided a capacitor dielectric composition comprising barium titanate ($BaTiO_3$), niobium pentoxide ($Nb_2O_5$) and gadolinium sesquioxide ($Gd_2O_3$).

According to another aspect there is provided a method of manufacturing a ceramic capacitor including the steps of forming a disc-shaped or tubular-shaped ceramic body from a dielectric composition comprising barium titanate ($BaTiO_3$), niobium pentoxide ($Nb_2O_5$) and gadolinium sesquioxide ($Gd_2O_3$), firing the ceramic body, providing separate opposed surfaces of the ceramic body with a respective metal coating, connecting a respective connecting wire to each metal coating and encapsulating the ceramic body in an insulating material.

DESCRIPTION OF THE PREFERRED EMBODIMENTS

We have found that small additions of niobium pentoxide ($Nb_2O_5$) and gadolinium sesquioxide ($Gd_2O_3$) to barium titanate ($BaTiO_3$) produce excellent flat (i.e. low variations in the temperature coefficient of capacitance (TCC) from $-25°$ C. to $85°$ C.), mid-K dielectric compositions. Mid-K dielectrics are those with dielectric constants of the order of 4000 and generally in the range 3000 to 5000. Barium titanate alone has a dielectric constant that is dependent on purity and crystallite size as well as its crystal structure which transforms at $0°$ C. and $125°$ C. These transformations are accompanied by sharp rises in dielectric constant such that the TCC from $-25°$ C. to $85°$ C. can vary by $\pm 100\%$. For example, a composition comprising 97.9% by weight ($BaTiO_3$) 1.1% by weight $Nb_2O_5$ and 1% by weight $Gd_2O_3$ (the composition constituents being milled together in a conventional manner) had, subsequent to firing at $1370°$ C., a dielectric constant value (K) of 4000 and TCC from $-35°$ C. to $85°$ C. in the range $\pm 20\%$. Such a value of K is higher than usually obtained for this TCC. Hitherto such TCC values were obtained for K values of the order of 2500.

In the following table the results for a number of dielectric compositions, having different proportions (by weight) of the constituents $BaTiO_3$, $Gd_2O_3$ and $Nb_2O_5$, subsequent to firing at $1370°$ C. for one hour are quoted.

TABLE I

| $BaTiO_3$ (%) | $Gd_2O_3$ (%) | $Nb_2O_5$ (%) | K | TCC ($-25°$ C. to $85°$ C.) % ($-25°$ to $25°$) | TCC ($-25°$ C. to $85°$ C.) % ($25°$ to $85°$) |
|---|---|---|---|---|---|
| 98.5 | 0.2 | 1.3 | 2900 | +100 | −50 |
| 98.1 | 0.6 | 1.3 | 3900 | −20 | −20 |
| 97.5 | 1.0 | 1.5 | 4400 | −30 | −30 |
| 98.3 | 1.1 | 0.6 | 3200 | −20 | −20 |
| 97.0 | 1.5 | 1.5 | 4600 | −35 | −35 |

Disc ceramic capacitors generally employ dielectric materials with K of the order of 2500 for the 2D4 class. The above table shows that there is a range of compositions based on barium titanate and having small additions (up to 1.5%) of gadolium sesquioxide and niobium pentoxide which are particularly useful for disc ceramic capacitors, although they may be suitable for other capacitor types, for example multilayer ceramic capacitors. This is particularly the case where temperature coefficients of capacitance of $+20$, $-30\%$ from $-25°$ to $85°$ C., corresponding to the 2D4 class of ceramic materials, are required.

Ceramic disc capacitors may be made by a process comprising the steps of forming a suitable ceramic dielectric composition, such as described above, to a required disc-like shape, firing the ceramic, providing opposite flat surfaces of the disc with a metal coating, soldering a respective connecting wire to each metal coating and encapsulating the body in an insulating material, such as a phenolic or epoxy resin.

The dielectric compositions described above may also be used for tubular ceramic capacitors which may be manufactured by a process comprising extruding a tubular ceramic body of rectangular cross-section, firing the ceramic body, depositing a metal layer on the inner and outer surfaces of the body, cutting the body up into required lengths and attaching connecting wires to the inner and outer metal layers prior to encapsulation in a phenolic or epoxy resin.

The dielectric compositions described above may also be useful for other capacitor applications, for example multilayer ceramic capacitors.

I claim:

1. A capacitor dielectric composition comprising barium titanate ($BaTiO_3$), niobium pentoxide ($Nb_2O_5$) and gadolinium sesquioxide ($Gd_2O_3$).

2. A capacitor dielectric composition as claimed in claim 1 comprising 97.9% by weight barium titanate, 1.1% by weight niobium pentoxide and 1% by weight gadolinium sesquioxide.

3. A capacitor dielectric composition as claimed in claim 1 wherein the constituents are in the proportion quoted in Table I.

4. A method of manufacturing a ceramic capacitor including the steps of forming a disc-shaped or tubular-shaped ceramic body from a dielectric composition comprising barium titanate ($BaTiO_3$), niobium pentoxide ($Nb_2O_5$) and gadolinium sesquioxide ($Gd_2O_3$), firing the ceramic body, providing separate opposed surfaces of the ceramic body with a respective metal coating, connecting a respective connecting wire to each metal coating and encapsulating the ceramic body in an insulating material.

5. A method of manufacturing a ceramic capacitor as claimed in claim 4, wherein the constituents of the dielectric comprise 97.9% by weight barium titanate, 1.1% by weight niobium pentoxide and 1% by weight gadolinium sesquioxide.

6. A method of manufacturing a ceramic capacitor as claimed in claim 4, wherein the constituents of the dielectric are in the proportions quoted in Table I.

7. A ceramic capacitor comprising a ceramic body formed from a fired dielectric composition comprising barium titanate ($BaTiO_3$), niobium pentoxide ($Nb_2O_5$) and gadolinium sesquioxide ($Gd_2O_3$), said ceramic body having opposed surfaces, a metal coating on each said surface, a connection terminal connected to each metal coating, and an encapsulating body of insulating material encapsulating the ceramic body.

8. A ceramic capacitor as claimed in claim 7, wherein the constituents of the dielectric composition comprise 97.9% by weight barium titanate, 1.1% by weight niobium pentoxide and 1% by weight gadolinium sesquioxide.

9. A ceramic capacitor as claimed in claim 7, wherein the constituents of the dielectric are in the proportions given in Table I.

* * * * *